March 25, 1952    J. RUTHVEN, JR., ET AL    2,590,724
INSULATED BOX
Filed Oct. 11, 1949    5 Sheets-Sheet 1
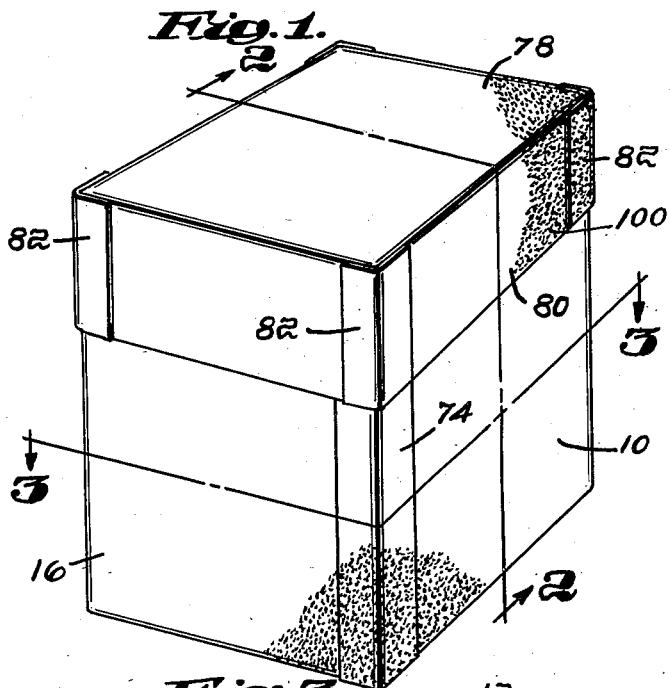
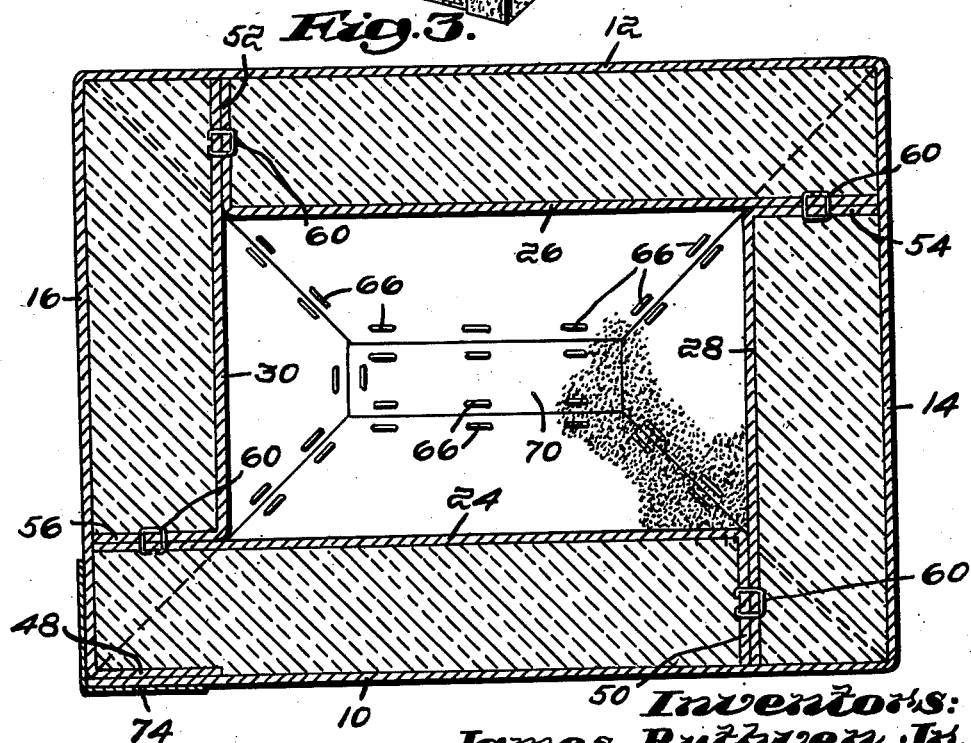
Inventors:
James Ruthven, Jr.
Robert G. Harrison,
by Thomson & Thomson Attorneys March 25, 1952     J. RUTHVEN, JR., ET AL     2,590,724
INSULATED BOX
Filed Oct. 11, 1949                         5 Sheets-Sheet 2
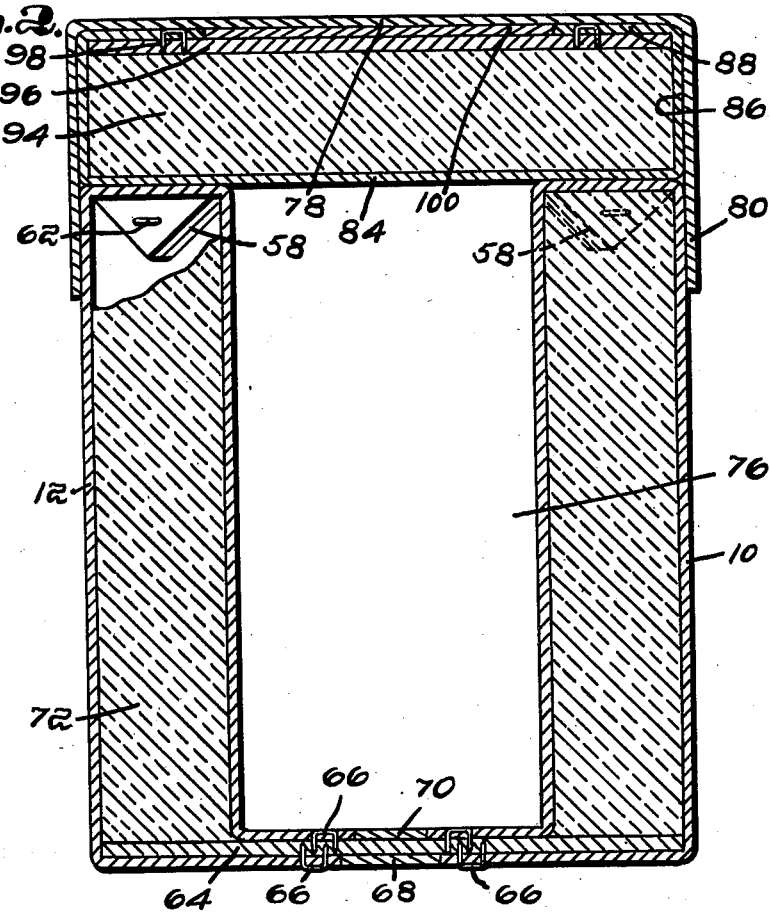
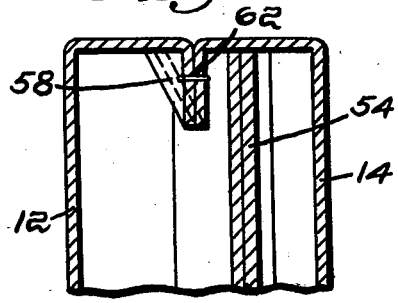
Inventors:
James Ruthven, Jr.
Robert G. Harrison,
by Thompson & Thompson
Attorneys Inventors:
James Ruthven, Jr.
Robert G. Harrison,
by Thomson & Thomson Attorneys March 25, 1952     J. RUTHVEN, JR., ET AL     2,590,724
INSULATED BOX Filed Oct. 11, 1949                              5 Sheets-Sheet 4

Inventors:
James Ruthven, Jr.
Robert G. Harrison,
by Thomson & Thomson
Attorneys March 25, 1952 J. RUTHVEN, JR., ET AL 2,590,724
INSULATED BOX
Filed Oct. 11, 1949 5 Sheets-Sheet 5

Inventors:
James Ruthven, Jr.
Robert G. Harrison,
by Thomson & Thomson
Attorneys Patented Mar. 25, 1952

2,590,724

UNITED STATES PATENT OFFICE 2,590,724

INSULATED BOX

James Ruthven, Jr., Rockland, and Robert G. Harrison, North Quincy, Mass.

Application October 11, 1949, Serial No. 120,737

3 Claims. (Cl. 229—16)

This invention relates to improvements in an insulated box and more particularly to a double-walled insulated corrugated carrying case which may be used to keep bottles or cans of beverages cool or for other purposes.

It is an object of our invention to provide a double-walled insulated case, the walls of which may be formed from a single blank of corrugated board and which is designed to be rigidly constructed to withstand rough treatment in use.

It is further an object of our invention to provide a double-walled insulated case and insulated cover for the case, the case and cover being formed of corrugated board having a waterproof coating thereon to resist water damage.

It is further an object of our invention to provide a double-walled insulated case made of corrugated board, the bottom of the case and top of cover being reenforced by plywood so that the case may be used as a seat.

Further objects and advantages of our improvements will be more readily apparent from the following description of a preferred embodiment thereof as illustrated in the accompanying drawings, in which:

Figure 1 is a perspective view of the box;

Figure 2 is a vertical section taken on the plane indicated 2—2 in Figure 1;

Figure 3 is a horizontal section taken on the plane indicated 3—3 in Figure 1;

Figure 9 is a fragmentary vertical section taken on the plane indicated 9—9 in Figure 5.

Figure 6:
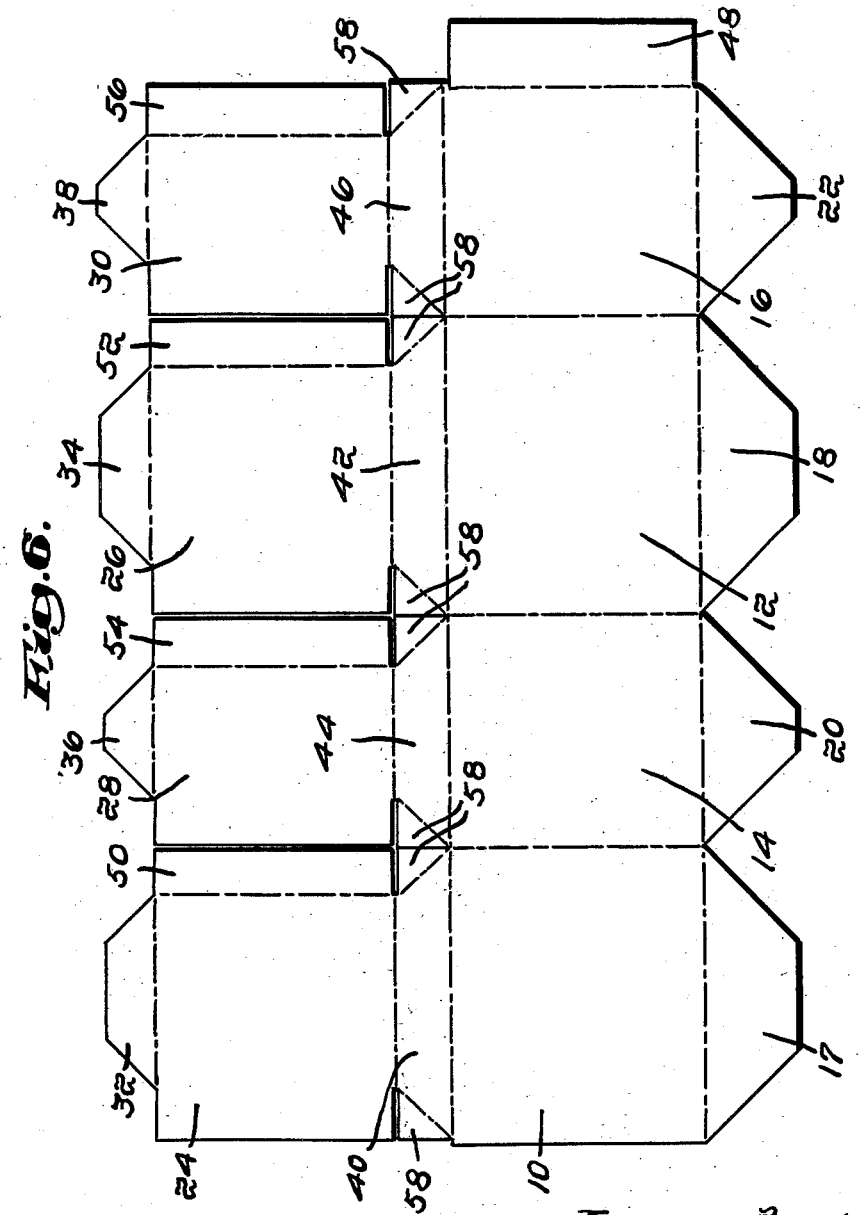
Figure 6 is a plan view of the blank from which the box is formed.

The blank from which the carton is formed is shown in Figure 6, in which the panels 10 and 12 are the outer side walls. The panels 14 and 16 are the outer end walls. The flaps 17, 18, 20 and 22 which extend from the panels 10, 12, 14 and 16, respectively, form part of the bottom wall of the carton as will be hereinafter explained. The panels 24 and 26 form the inner side walls, while the panels 28 and 30 form the inner end walls. The flaps 32, 34, 36 and 38 which extend from the panels 24, 26, 28 and 30, respectively, form part of the inner bottom wall as will be hereinafter explained.

Between the panels 10 and 24 there is provided a connecting strip 40 which serves as a spacer between the inner and outer walls of the carton. This space as hereinafter explained is filled with insulating material. Similar connecting strips 42, 44 and 46 are provided between the panels 12 and 26; the panels 14 and 28; and the panels 16 and 30, respectively.

The flap 48 extending from the panel 16 is overlapped by the panel 10 at one corner of the carton, as shown in Figure 3. The panel 24 has a flap 50 which is suitably fastened to the panel 28, as shown in Figure 3. The panel 26 has a similar flap 52 which is fastened to the panel 30 and the panels 28 and 30 have corresponding flaps 54 and 56.

Figure 4:
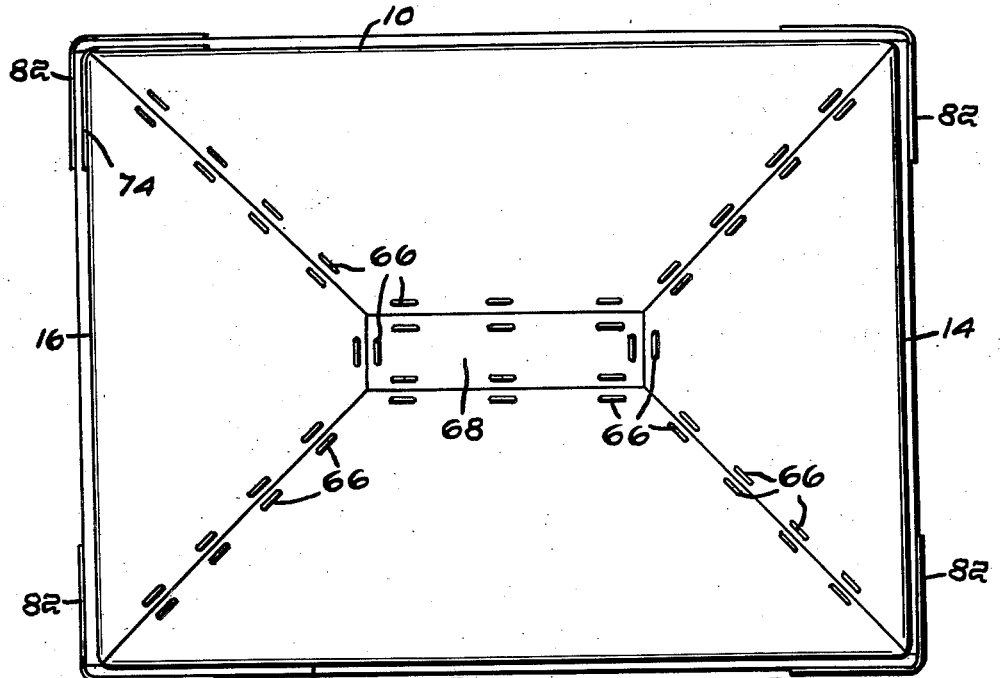
Figure 4 is a bottom view of the box.
Figure 5:
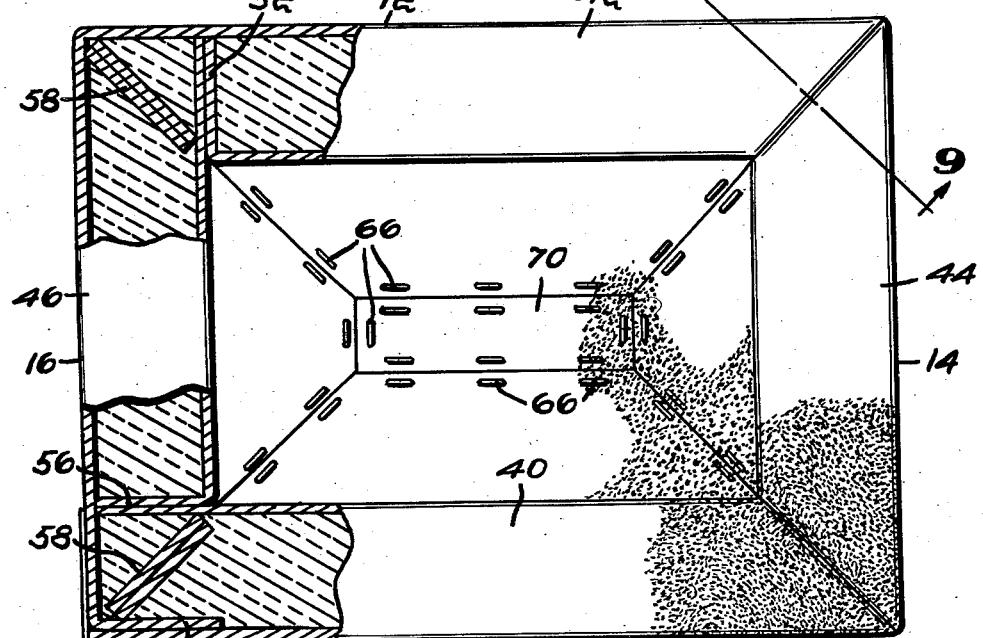
Figure 5 is a top view of the box without the cover, portions of the box being broken away to disclose the interior construction.

The connecting strips 40, 42, 44 and 46 are shaped to meet at their ends, as shown in Figure 5, and are provided with the tabs 58 which are turned downwards, as shown in Figures 2 and 9, and are suitably fastened together. These tabs serve to strengthen the corners of the carton.

The flaps from the inner side walls may be fastened such as by the staples 60, as shown in Figure 3, and staples 62 may similarly be used to fasten the tabs 58. Between the flaps 17, 18, 20 and 22 and the flaps 32, 34, 36 and 38, which form the bottom of the carton, we preferably insert a sheet of plywood or stiff fibreboard 64, as shown in Figure 2, and the flaps are suitably fastened to the fibreboard such as by staples 66.

Filler pieces 68 and 70 are used to fill the spaces between the ends of the flaps. These pieces, 68 and 70, may be suitably glued or otherwise attached such as by staples 66 to the plywood reenforcement 64. The space between the inner and outer side walls of the carton is filled with a suitable insulating material 72.

The joint between the panel 10 and the panel 16, at one vertical corner edge of the box, is covered by a reenforcing strip 74. The compartment 76 within the carton forms the storage space.

Figure 7:
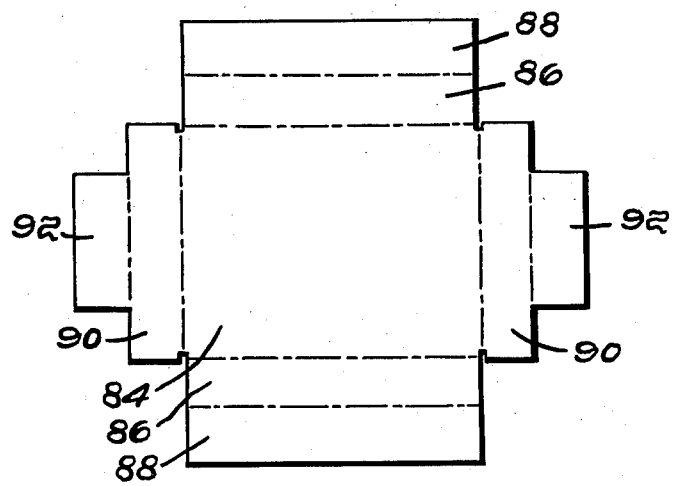
Figure 7 is a plan view of a blank forming part of the cover.
Figure 8:
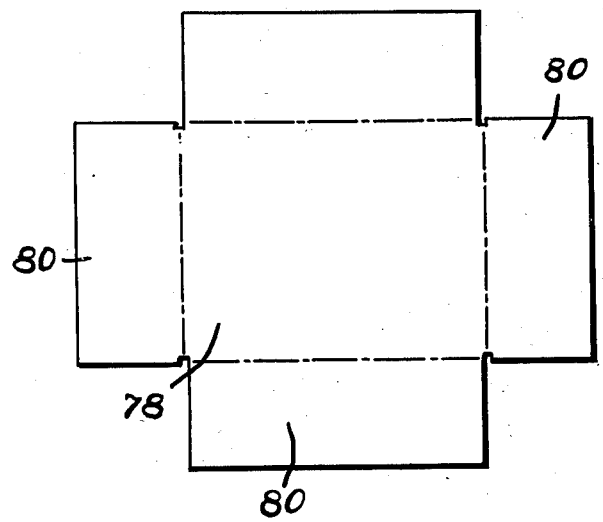
Figure 8 is a plan view of the blank and another part of the cover.

A suitable insulated cover is also made for the carton. The cover is cut from two blanks shown in Figures 7 and 8. Figure 8 shows the outer part of the cover comprising the central panel 78 which forms the top wall of the cover and the flaps 80 which form the sides. The meeting edges of the flaps 80 are suitably reenforced by the strips 82, as shown in Figure 1. The inner part of the cover is shown in Figure 7, comprising the central panel 84 having at its side edges the double flaps 86 and 88 and at its end edges the double flaps 90 and 92. The cover part, shown in Figure 7, is suitably formed to shape; filled with insulation 94, then a reenforcing sheet of plywood or stiff fibreboard 96 is inserted to which the flaps 88 and 92 are secured, such as by staples 98. The inner part of the cover is then assembled with the outer part 88 and these parts are suitably glued together.

The blank shown in Figure 6 is folded to form the box. It will be noted that one edge of each inside wall is extended to contact the inside face of an outer wall, while the other edge of each inside wall is folded, whereby the edge contacts the inner face of an adjacent wall of the box. As shown in Figure 3, the panel 24 extends to form a brace against the outer wall 16, while the flap 50 of the panel 24 is turned at right anges and forms a brace for the outer wall 10. The folded flap 50 is suitably fastened to the extension of the panel 28. The fastening may be the staples 60 as shown.

The triangular tabs 58 are turned down into the space between the inner and outer walls and fastened such as by staples 62, as shown in Figure 9. The space between the inner and outer walls is filled with suitable insulation material. The bottom of the box is then reenforced by the sheet 64 of plywood or stiff fibreboard and the flaps which are turned in from the inner and outer walls are suitably fastened to the plywood such as by the staples 66.

The space between the flaps on the inner and outer surface at the bottom are filled with pieces of corrugated board or other suitable material cut to fill the spaces. The bottom of the box, both inside and out, may then be covered to form a smooth surface. We may use tape material adhesively applied and the adhesive tape may also be applied to the edge, to the vertical edge of one corner of the box where the joint is made and is shown by the tape 74 in Figures 1 and 3. It is also desirable to cover the entire box with a suitable waterproof-abrasive-resisting coating 100 for example we may use Geon latex. This coating will prevent water or other liquids from causing deterioration of the corrugated board.

The cover is formed from the two blanks shown in Figures 7 and 8, the cover being reenforced by sheets of plywood or other suitable material and the space within the cover is filled with insulated material. If the box is to be carried, a suitable handle can be fixed to the box. The specific handle construction has not been disclosed.

We claim:

1. In a double-walled insulated box, a single blank of corrugated board folded to form the box, the outer walls being joined by folded vertical edges except at one vertical edge, the pair of outer walls which meet at said last named vertical edge being joined together by a flap of one of said walls, a reinforcement secured to the exterior of the box to seal the joint between said pair of walls, each of the inner vertical walls being connected to an outer wall by a flap which forms a top closure for the space between said walls, each of said inner walls having an extension abutting at a free vertical edge against an outer wall at a right angle to the inner wall and each of said inner walls having a vertical flap abutting at its free vertical edge against an outer wall which is parallel to the inner wall, said vertical flap overlapping an extension from an adjacent inner wall and means for securing together said inner wall flaps and inner wall extensions.

2. In a double-walled insulated box, a single blank of corrugated board folded to form the box, the outer walls being joined by folded vertical edges except at one vertical edge, the pair of outer walls which meet at said last named vertical edge being joined together by a flap of one of said walls, a reinforcement secured to the exterior of the box to seal the joint between said pair of walls, each of the inner vertical walls being connected to an outer wall by a flap which forms a top closure for the space between said walls, each of said inner walls having an extension abutting at a free vertical edge against an outer wall at a right angle to the inner wall and each of said inner walls having a vertical flap abutting at its free vertical edge against an outer wall which is parallel to the inner wall, said vertical flap overlapping an extension from an adjacent inner wall and means for securing together said inner wall flaps and inner wall extensions, said inner and outer walls having bottom flaps folded inwardly in parallel planes, a reinforcing member for the entire area of the bottom of the box and means for securing said flaps to said reinforcement.

3. In a double-walled insulated box, a single blank of corrugated board folded to form the box, said blank having four panels joined to each other to form the outer walls of the box, four flaps joined to each other and to the outer wall panels to form a top closure between the inner and outer walls of the box, four panels each of which is connected to one of said flaps, each of said last named panels forming the inner wall of the box and having a vertical flap folded at right angles from the inner wall portion to abut against a parallel outer wall and each of said inner wall panels having an extension from the inner wall portion in the plane thereof and abutting against an outer wall at right angles to the inner wall portion.

JAMES RUTHVEN, JR.
ROBERT G. HARRISON.

REFERENCES CITED

The following references are of record in the file of this patent:

UNITED STATES PATENTS

| Number | Name | Date |
|---|---|---|
| 1,008,963 | Ekermeyer | Nov. 14, 1911 |
| 1,065,398 | Scudder | June 24, 1913 |
| 1,527,167 | Birdseye | Feb. 24, 1925 |
| 1,691,178 | Beaman | Nov. 13, 1928 |
| 2,118,565 | Meade | May 24, 1938 |
| 2,332,287 | Zalkind | Oct. 19, 1943 |
| 2,370,749 | Perkins | Mar. 6, 1945 |